United States Patent [19]

Wu

[11] Patent Number: 5,160,027
[45] Date of Patent: Nov. 3, 1992

[54] HOLDER FOR A CASSETTE TAPE

[76] Inventor: Hans Wu, No. 78, Chung-Shan Wu St., Tainan City, Taiwan

[21] Appl. No.: 808,898

[22] Filed: Dec. 18, 1991

[51] Int. Cl.⁵ .................. B65D 85/672; B65D 85/62; A47G 19/00
[52] U.S. Cl. ............................ 206/387; 206/504; 220/23.4
[58] Field of Search ............... 206/387, 504; 220/23.4

[56]  References Cited

U.S. PATENT DOCUMENTS

| | | | |
|---|---|---|---|
| 3,635,350 | 1/1972 | Wolf | 206/504 |
| 3,746,180 | 7/1973 | Spiroch et al. | 206/387 X |
| 3,851,936 | 12/1974 | Muller | 220/23.4 |
| 3,909,088 | 9/1975 | Dennehey et al. | 206/387 X |
| 4,512,469 | 4/1985 | West | 206/387 |
| 4,523,680 | 6/1985 | Saito et al. | 206/387 |

FOREIGN PATENT DOCUMENTS

| | | | |
|---|---|---|---|
| 1139998 | 11/1962 | Fed. Rep. of Germany | 220/23.4 |
| 2434089 | 1/1976 | Fed. Rep. of Germany | 220/23.4 |
| 1540795 | 2/1979 | United Kingdom | 206/387 |

Primary Examiner—William I. Price
Attorney, Agent, or Firm—Cushman, Darby & Cushman

[57]  ABSTRACT

The casing includes a closed bottom, an open top, two long opposed side walls, a short side wall interconnecting the two long opposed side walls and an opening opposite the short side wall. Each of the long opposed walls has an exterior face on which an elongated dovetail projection and dovetail groove are alternately provided. The dovetail projection of one of the long side walls is capable of being received in the dovetail groove of the other long side wall, and vice versa. The short side wall has a top portion higher the height of the long opposed wall from which a pair of resilient tabs extends. Each of the resilient tabs has a round projection extending one opposite the other.

4 Claims, 10 Drawing Sheets

HOLDER FOR A CASSETTE TAPE

BACKGROUND OF THE INVENTION

1. Field of Invention

This invention relates to a holder, more particularly to a holder for storing a cassette tape therein, which holder is suitable for use in a car.

2. Field of the Related Art

There are already several kinds of cassette tape holders in the market, each one of which has their respective usage.

Figure 1:
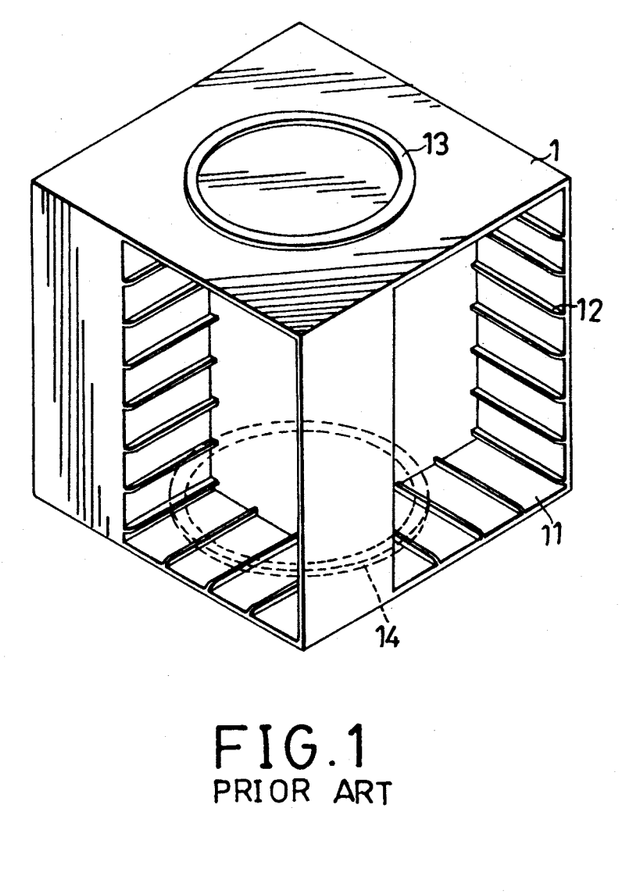
FIG. 1 shows a cassette tape holder of the prior art.

FIG. 1 shows a schematic, perspective view of a cassette tape holder of the prior art. Accordingly, the holder (1) has four rectangular shaped receiving spaces (11) for storing a plurality of tapes therein, each receiving space being formed with a plurality of ribs (12) for dividing said receiving space. Said holder has an annular protrusion (13) on the top surface and a recessed portion (14) at the bottom, which recessed portion is adapted to fit on the annular protrusion of the top surface so that one holder can be provided on top of the other for holding several cassette tapes. If two holder are thus placed, they will collapse once shaken. In addition to this, holders thus placed can not be placed sideways in a car because the side of the receiving space adjacent to the side of a car is shielded so that a cassette tape there is not easy to take out. Thus, this holder is not suitable for use in a car.

Figure 2:
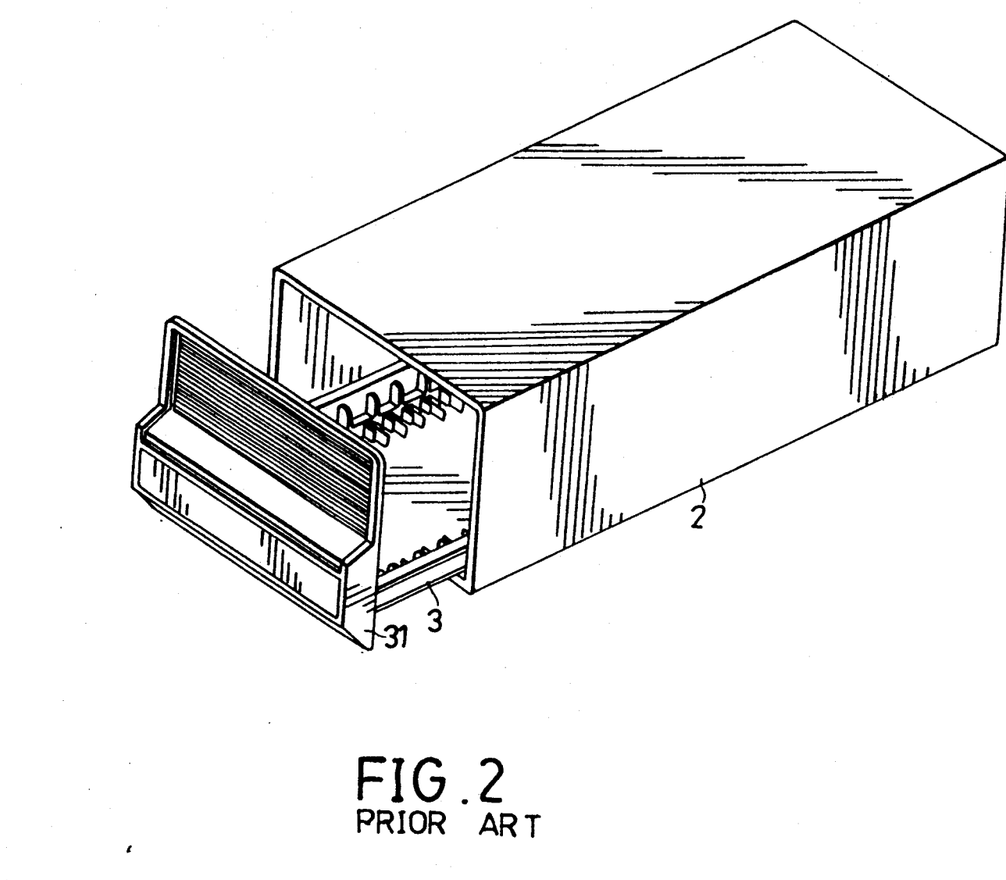
FIG. 2 shows another cassette tape holder of the prior art.

Referring to FIG. 2, another kind of cassette tape holder of the prior art is shown to include a drawer-like holder (3) inserted in a box (2). The drawer is provided with a plurality of detachable partitions so that the space between each partition can be adjusted for placing cassette tapes of different types therein. The drawer is also provided with a grip (31) for facilitate pulling the same out of the box (2). The disadvantage of the drawer-like holder is that the place in front of it must always be wide enough for the drawer to extend out of the box so as to take out a tape therefrom.

SUMMARY OF THE INVENTION

In a car where there is limited space for a user, it is highly desirable from a construction point of view to provide a cassette tape holder especially for use in a car.

An object of the present invention is to provide a cassette tape holder which can hold a cassette firmly therein so that said cassette tape will not fall out from the holding space of the holder even when the holder is shaken.

Accordingly, a cassette tape holder of the present invention includes a box-like member having a closed bottom, an open top, two opposed long side walls, a short side wall interconnecting the two opposed long side walls and an opening opposite said short side wall. Each of the two opposed long side walls has an exterior surface on which an elongated dovetail groove and an elongated dovetail projection are alternately provided. The elongated dovetail projection of the long side wall is capable of being received in the elongated dovetail groove of another long side wall and vice versa. The short side wall has a top portion higher than the height of the long side wall from which a pair of resilient tabs extends parallel with the long side wall. Each of the resilient tabs has a round projection which extends one opposite the other.

BRIEF DESCRIPTION OF THE DRAWINGS

Other features and advantages of the present invention will become more apparent in the following detailed description, including drawings, all of which show a non-limiting form of the invention, and of which.

DETAILED DESCRIPTION OF THE PREFERRED EMBODIMENT

Figure 3:
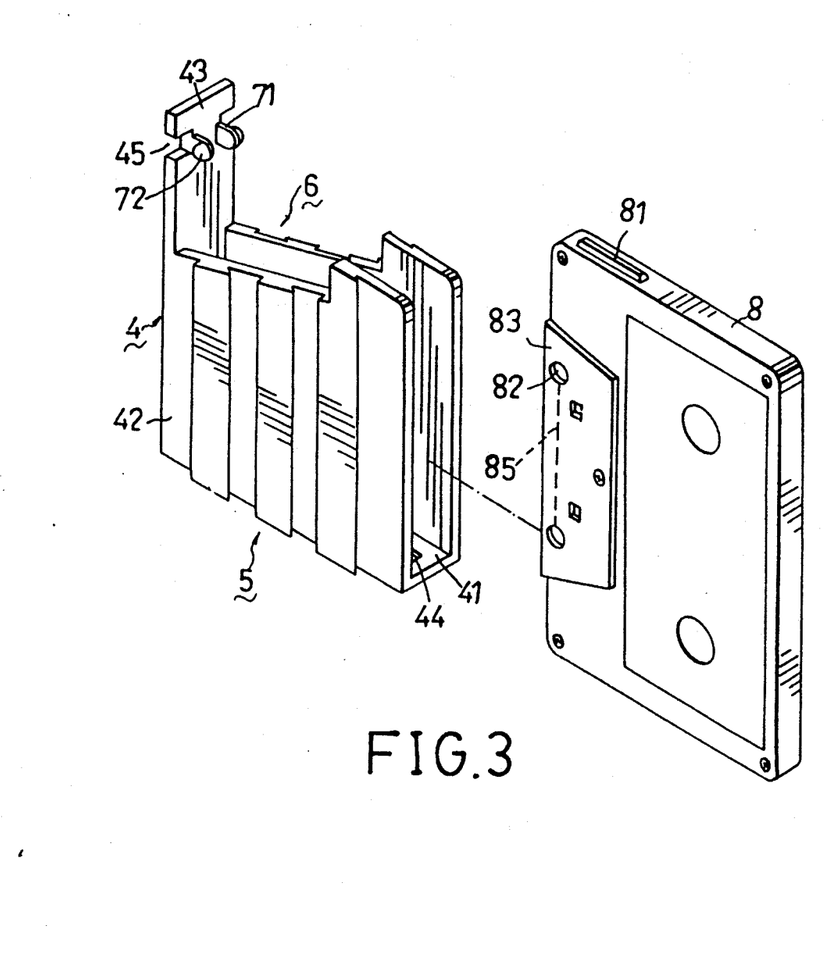
FIG. 3 shows a schematic, perspective cassette tape holder of the present invention.

It is to be understood that the holder of the present invention is intended especially for holding a most common cassette tape (8) as shown in FIG. 3, such as the one used in a portable cassette player. As shown, in the illustration, the cassette tape has a safety lug (81), one on each of the short edges, and two holes (82) on the two opposed sides which sandwich a pressure pad (85) which runs along the long edge thereof and a protrusion (83) on each exterior surface of the two opposed sides.

Figure 5:
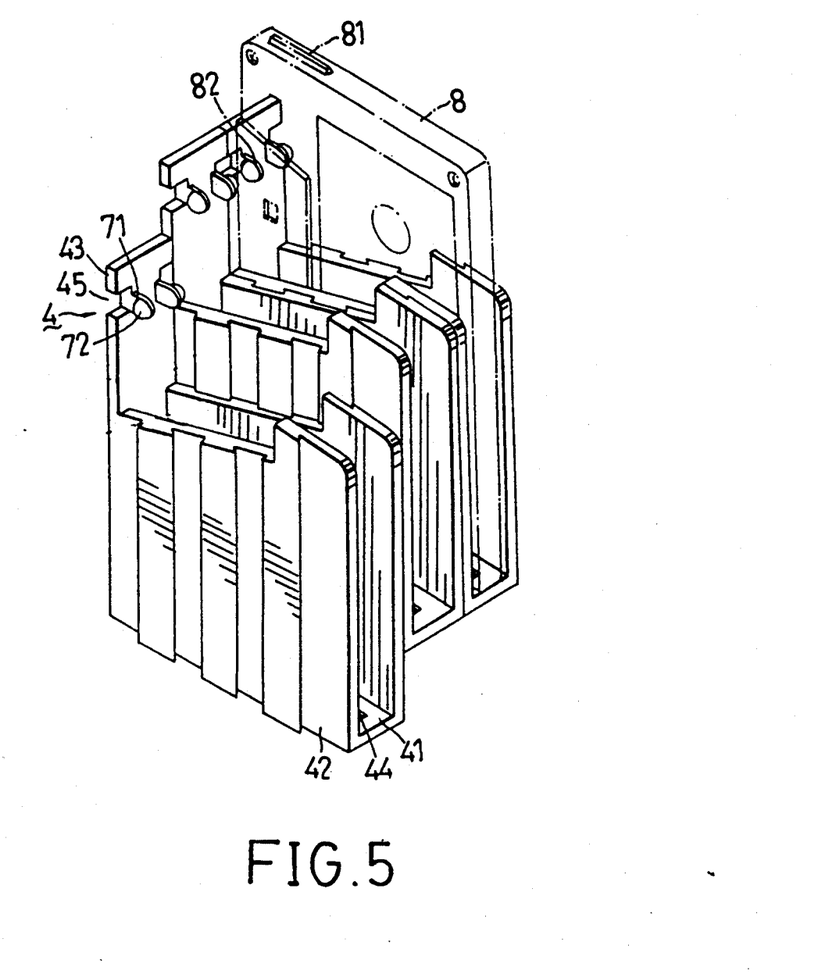
FIG. 5 shows the tape holder of FIG. 3 being joined with other holder of the same kind.

Referring to FIG. 3, the holder of a cassette tape includes a box-like member (4) having a closed bottom (41), an open top, a pair of long opposed side walls (42), a short side wall (43) interconnecting the pair of long opposed side walls (42), and an opening opposite the short side wall (43). Each of the long opposed side walls (42) has an elongated dovetail groove (6) and an elongated dovetail projection (5) which are alternately provided on the exterior surface of the same. The elongated dovetail projection (5) of one of the long opposed side walls is capable of being received in the elongated dovetail groove (6) of the other of the long opposed side walls and vice versa. Therefore, each of the holders of the present invention can be joined with another one of the same holder to form a unit, as shown in FIG. 5, for holding several cassette tapes.

An important aspect of the preferred embodiment is that the short side wall (43) has a top portion higher than the height of the long opposed side wall (42), which top portion has two recessions (45) adjacent to the top thereof. A pair of resilient tabs (71) respectively extends from the recession (45) in a direction parallel with the long opposed side walls. Each of the resilient tabs (71) has a round projection (72) which extends one opposite the other. The space between the two resilient tabs (71) is smaller than the distance between the two opposed sides of the cassette tape (8) but equal to the pressure pad (85) between the two opposed sides of the same. Therefore, when the tape is placed in the holder (4) the round projections (72) of the resilient tabs (71) resiliently extend into two opposed sides of the cassette tape, one tab on each side of the pressure pad (85), and respectively engages in the holes (82) of the two opposed sides of the cassette tape (8).

Figure 4:
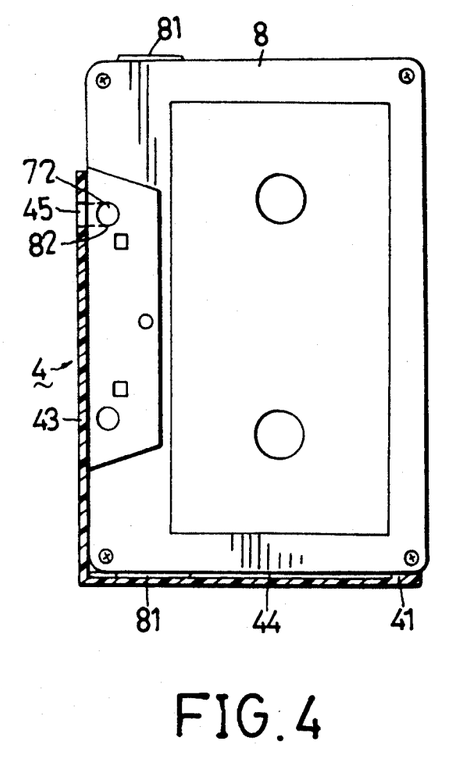
FIG. 4 show a cassette tape holder of FIG. 3 holding a cassette tape therein.

In order that a cassette tape (8) can fit properly in the holder (4) after it is placed therein, the closed bottom (41) of the holder (4) is made to have an elongated recessed groove (44) so that the safety lug (81) of the cassette tape (8) can be received in the recessed groove (44), two features respectively illustrated in FIG. 4.

When taking the cassette tape (8) out of the holder (4), one only need to press the round projections (72) with two fingers from the outside. The distance between two long opposed walls (42) is also made equal to the thickness of the tape. Once the tape (8) is placed therein, the tape stays firm and can tolerate a slight movement of a car.

Figure 6:
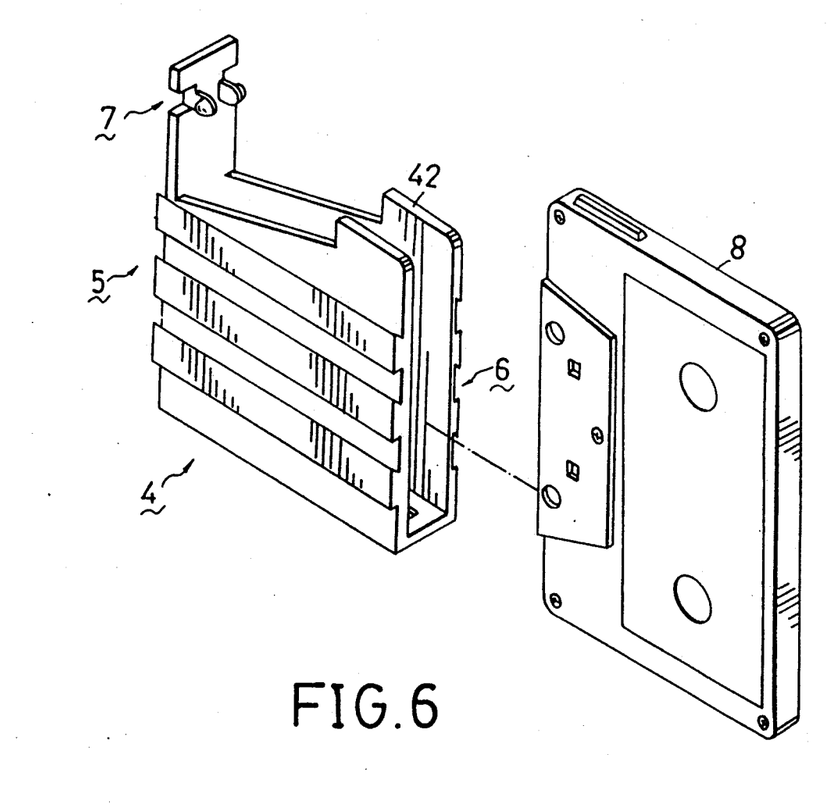
FIG. 6 shows a second preferred embodiment of the tape holder of the present invention.
Figure 7:
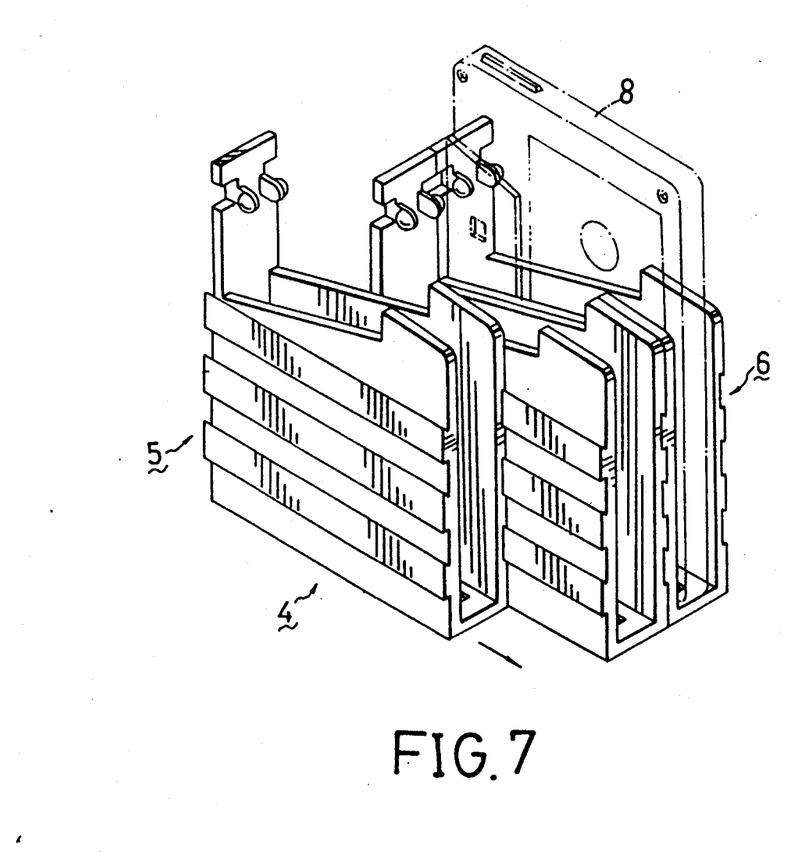
FIG. 7 shows the tape holder of FIG. 6 being joined with another holder of the same kind.

Making dovetail groove (6) and projection (5) in the two long opposed walls (42) parallel or vertical to the horizontal line is just a matter of choice, as seen in FIGS. 5 and 6. It is hoped that this should not limit the scope of the present invention. FIG. 7 shows a holder (4) of the present invention, which two long opposed side walls (42) have elongated dovetail grooves (6) and projections (5) parallel with a horizontal line. The features are all the same as in the first preferred embodiment.

Figure 8:
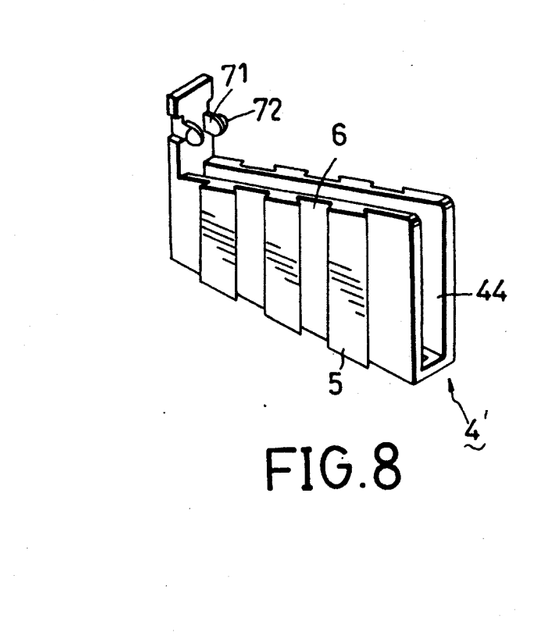
FIG. 8 shows a third preferred embodiment of the tape holder of the present invention.
Figure 9:
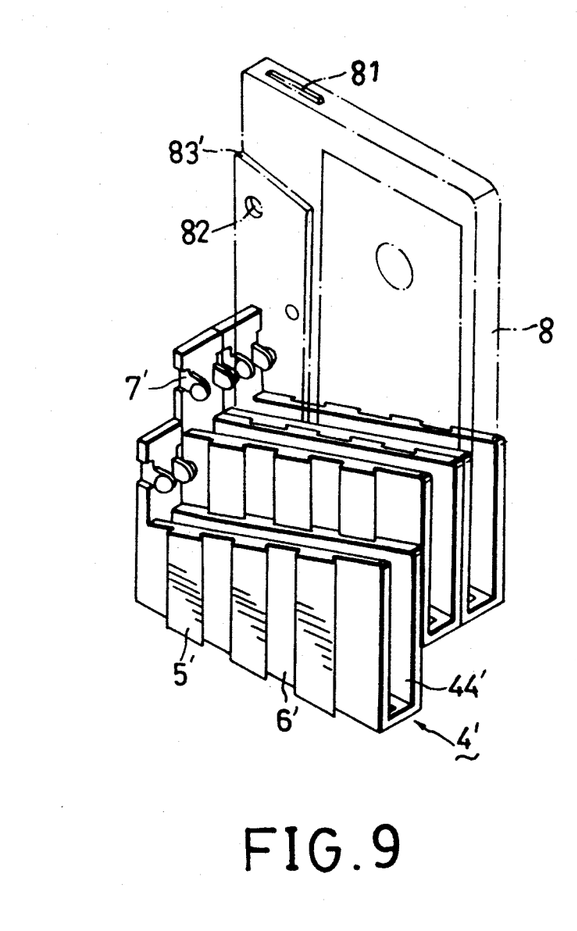
FIG. 9 shows the tape holder of FIG. 8 being joined with another holder of the same kind.

Referring to FIGS. 8 and 9, to make the best use of scare space in a car, the holder (4) of the present invention is made to the minimum size such that the distance (44') between the two long opposed side walls is 5 mm, which is equal to the thickness of the cassette tape (8') measured outside of the protrusion (83') of the same. But the thickness between the protrusion (83') of the two opposed sides of the cassette tape (8') is 6 mm. The thickness of the holder (4') is 8 mm. Therefore, each of the long side walls has a thickness of 1.5 mm. The height of the long side walls of the holder (4') can be made shorter than that of the first preferred embodiment so that after the cassette (8') is inserted therein, the protrusion (83') of the cassette tape (8') will be protruded from the holder as shown in FIG. 9. Thus 1 mm of space can be saved in constructing the holder of the present embodiment. The remaining features are the same as in the first embodiment.

Figure 10:
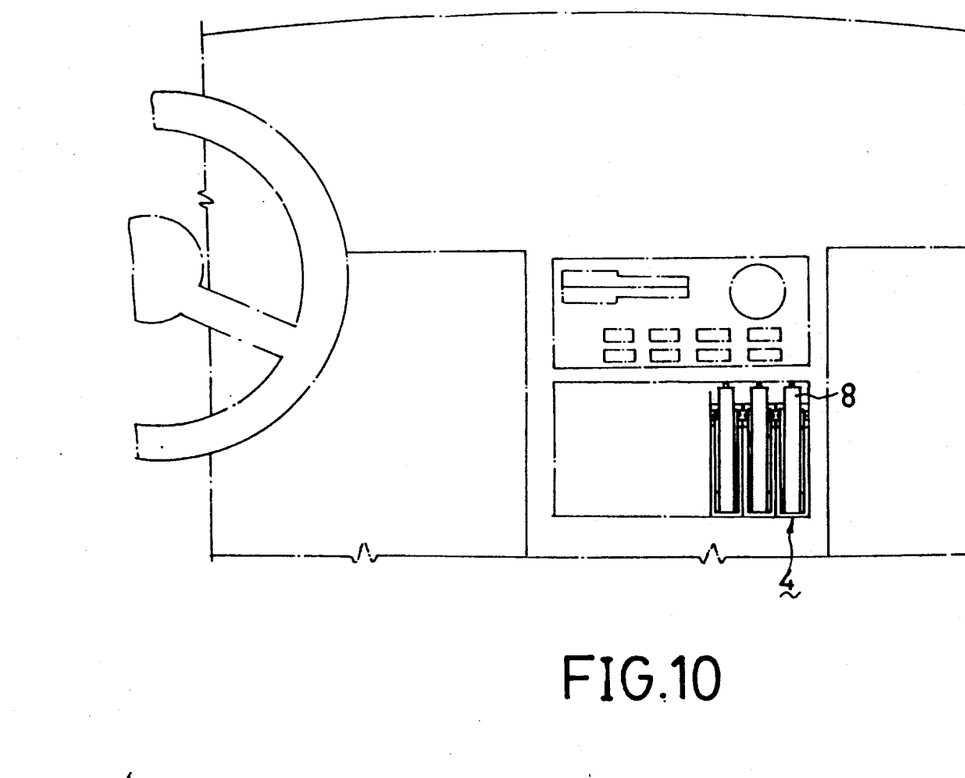
FIG. 10 shows a tape holder of the present invention being installed in a car.
Figure 11:
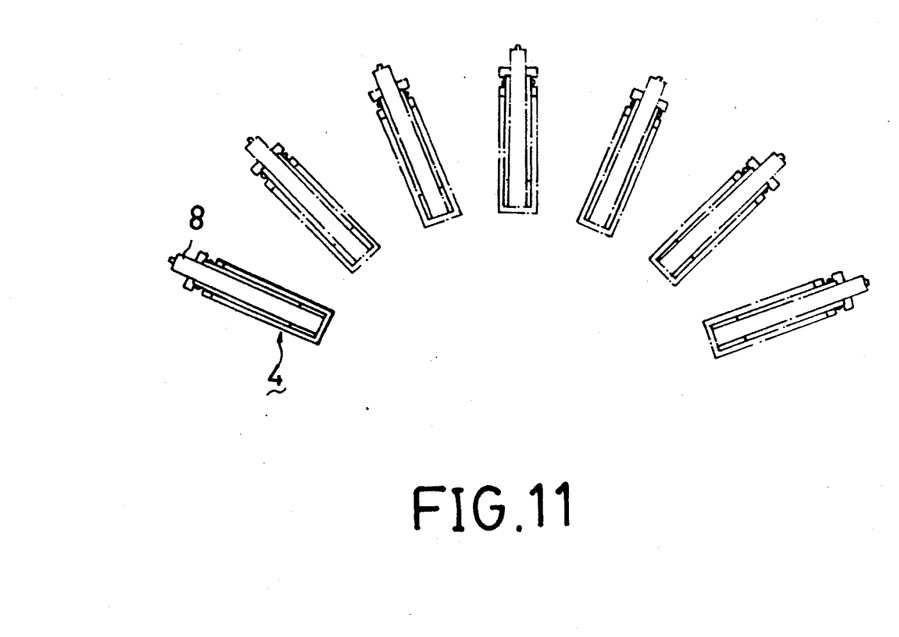
FIGS. 11 and 12 show a plurality of tape holders of the present invention being joined together.
Figure 12:
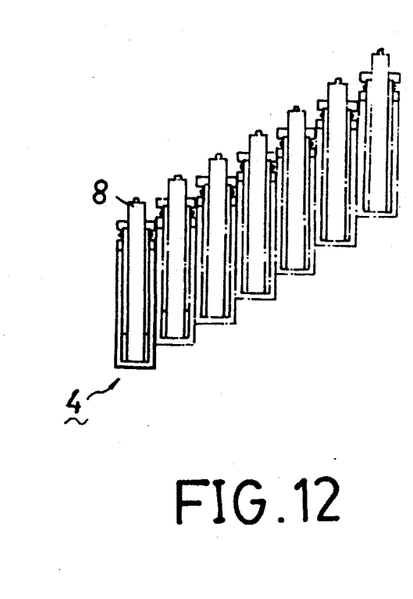

As shown in FIGS. 10 and 11, a holder of the present invention can be employed in a car in any design one pleases. They can be adhesively attached to the side of a car, or they can be fitted in a predetermined place according to the available space in the car.

To summarize, the holder produced according to the present invention can provide the following advantages:

(1) Since each holder can be joined with the other, the size of the holding space in the car can be adjusted according to the available space.

(2) Since each holder has a resilient tab to engage the cassette tape placed therein, it can withstand the movement of a car while driving.

(3) The short side wall of the holder can be independently adhered to a wall so that the holder can be used any where, not only in a car.

With the invention thus explained, it is obvious to those skilled in the art that various modifications and variations can be made without departing from the scope and spirit of the present invention. It is therefore intended that this invention be limited only as in the appended claims.

I claim:

1. A holder for a cassette tape comprising:
a box having a closed bottom, an open top, a first and second opposed side walls, a third side wall interconnecting said first and second opposed side walls and an opening opposite said third side wall, each of said first and second side walls having an exterior including an elongated dovetail groove and an elongated dovetail projection alternatively provided thereon, said elongated dovetail projection of said first opposed wall adapted to be received in said elongated dovetail groove of said second long opposed wall and vice versa, said third side wall having a top portion higher than the height of said opposed side walls and a pair of resilient tabs extends parallel with said long opposed side walls from said top portion of said third side wall, each of said resilient tabs having a round projection extending one opposite the other.

2. A holder as claimed in Claim 1, wherein said holder includes at least two of said boxes.

3. A holder as claimed in Claim 1, wherein said projections of said resilient tabs of said third side wall can resiliently engage holes of a cassette tape when the former is placed in said box.

4. A holder as claimed in Claim 1, wherein said closed bottom has a top surface which has an elongated recessed groove thereon.

* * * * *